Figure 1:
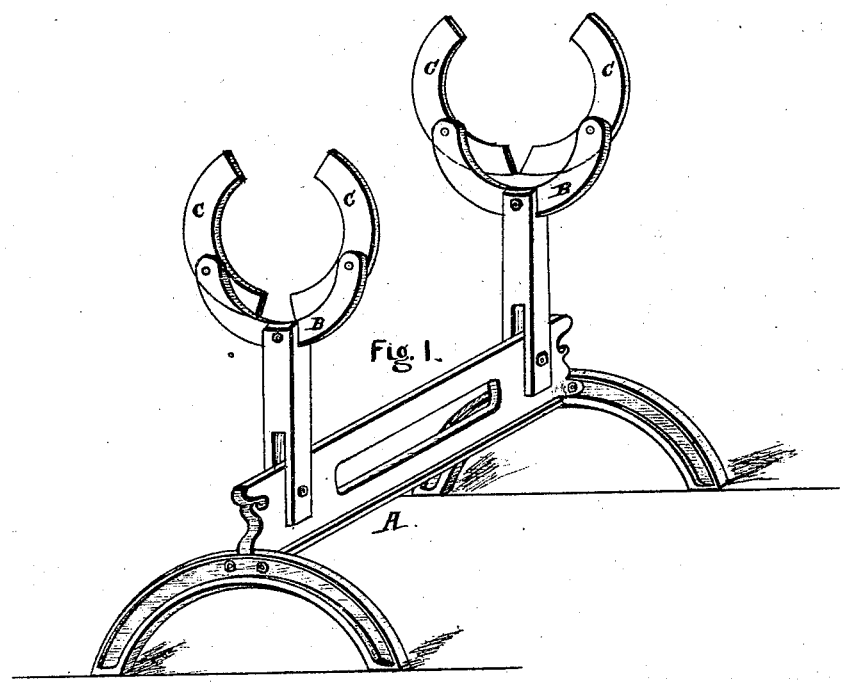

A. Whitlock,
Saw Buck.
No. 106,438. Patented Aug. 16. 1870.

Witnesses:
Susan A. Whitlock.
Eugenia Whitlock.

Inventor.
Abel Whitlock.

United States Patent Office.

ABEL WHITLOCK, OF DANBURY, CONNECTICUT.

Letters Patent No. 106,438, dated August 16, 1870.

IMPROVEMENT IN SAW-JACK.

The Schedule referred to in these Letters Patent and making part of the same

*To all whom it may concern:*

Be it known that I, ABEL WHITLOCK, of Danbury, in the county Fairfield, in the State of Connecticut, have invented a new and improved Saw-Jack; and I do hereby declare that the following is a full and exact description thereof, reference being had to the accompanying drawings and to the letters of reference marked thereon.

The nature of my invention consists in the structure and operation of the socket-arms, which receive and hold the stick to be sawed, adjusting their greater separation to support longer sticks by swerving on pivots outward, and their lesser separation by swerving inward.

On the branches of the socket-arms I attach gripes, which hold the stick firmly when placed in and being sawed, which gripes are caused to act by the stick when being placed in and to retain their gripe by the weight of the stick, the adjustment being effected easily, and the stick to be sawed being held firmly.

To enable others skilled in the art to make and use my invention, I will proceed to describe its construction and operation.

I construct my saw-jack of cast iron, but wood, or wood and iron, may be used. I make the lower part or foot of the jack with legs, and a plate attached to the legs, which plate sustains the socket-arms, attached to it by pivots, on which they turn, when the socket-arms are adjusted to shorter or longer distances by swerving inward or outward to sustain longer or shorter sticks to be sawed.

The socket-arms branch out in convenient form to receive sticks placed in them to be sawed. On each of these branches are gripes, attached by pivots, on which they turn.

The gripes open when the stick is taken out and close when the stick is placed in, the weight of the stick causing the gripes to hold the stick firmly.

Saw-jacks adjusted by the sliding mode usually are inconvenient and unsteady, and they are inadequate to hold the stick firmly.

Figure 1 is a view of the saw-jack.

Letters A B C exhibit the parts.

What I claim as my invention, and desire to secure by Letters Patent, is—

The saw-jack herein described, when constructed and operated substantially as and for the purpose set forth.

ABEL WHITLOCK.

Witnesses:
 ADALINA WHITLOCK,
 EUGENIA WHITLOCK.